United States Patent [19]

Campbell

[11] Patent Number: 5,201,099

[45] Date of Patent: Apr. 13, 1993

[54] SEAT BELT ADJUSTER

[75] Inventor: Terry A. Campbell, Prince George, Canada

[73] Assignee: Masterlink Marketing Inc., Prince George, Canada

[21] Appl. No.: 889,559

[22] Filed: May 27, 1992

[51] Int. Cl.$^5$ .............................................. A44B 11/00
[52] U.S. Cl. ........................................ 24/198; 24/186; 24/199; 297/483; 280/808
[58] Field of Search ................. 24/198, 199, 186, 168, 24/633, 634, 307, 453; 297/468, 483, 474; 280/808

[56] References Cited

U.S. PATENT DOCUMENTS

| | | | |
|---|---|---|---|
| 1,769,753 | 7/1930 | Reuter | 24/198 |
| 2,040,958 | 5/1936 | Schottenfels | 24/198 |
| 2,419,662 | 4/1947 | Sutton | 24/186 |
| 3,112,542 | 12/1963 | Brunson | 24/543 |
| 3,713,622 | 1/1973 | Dinger | 24/543 |
| 3,823,443 | 7/1974 | Takabayashi | 24/186 |
| 4,038,726 | 8/1977 | Takabayashi | 24/186 |
| 4,072,323 | 2/1978 | Shimokawa et al. | 280/745 |
| 4,356,599 | 11/1982 | Larson et al. | 24/543 |
| 4,609,205 | 9/1986 | McKeever | 280/808 |
| 4,786,078 | 11/1988 | Schreier et al. | 280/808 |
| 4,826,250 | 5/1989 | Ibanez | 297/483 |
| 4,832,367 | 5/1989 | Lisenby | 280/808 |
| 4,866,818 | 9/1989 | Thompson | 24/543 |
| 4,893,835 | 1/1990 | Linden | 280/808 |
| 5,025,534 | 6/1991 | Meijer | 24/172 |
| 5,042,838 | 8/1991 | Carter | 280/808 |
| 5,088,161 | 2/1992 | Robertson | 24/199 |

FOREIGN PATENT DOCUMENTS

| | | | |
|---|---|---|---|
| 2248815 | 7/1973 | Fed. Rep. of Germany | 24/198 |
| 0631682 | 12/1927 | France | 24/198 |
| 0661885 | 7/1929 | France | 24/198 |
| 0317092 | 12/1956 | Switzerland | 24/198 |

Primary Examiner—Victor N. Sakran
Attorney, Agent, or Firm—Townsend and Townsend Khourie and Crew

[57] ABSTRACT

A seat belt adjuster is provided for holding the lap seat belt to the shoulder belt of an automobile seat belt and prevent the shoulder belt rubbing against the neck of a wearer. The adjuster is made of a single unitary piece and therefore cannot be separated. A frame member formed of resilient material has a front portion, rear portion, top edge, bottom edge and space between the front and back portions for containing the lap seat belt. There is a hinge at the top edge joining the rear and front portions together and a retaining snap at the bottom edge to hold the two portions together. A clip forms part of the front portion extending down from the top edge retains the shoulder belt.

4 Claims, 2 Drawing Sheets

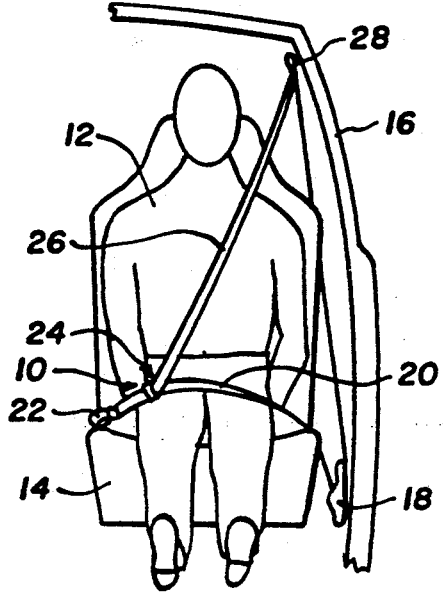
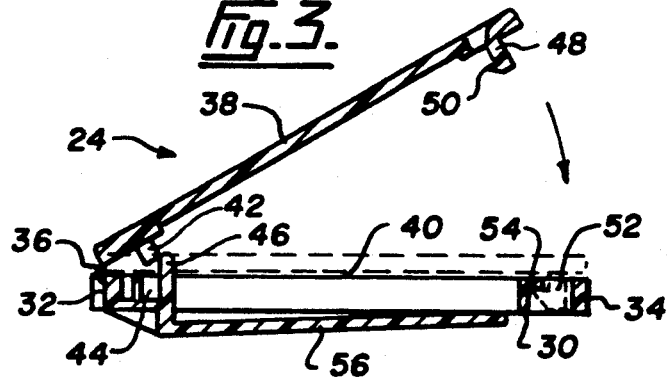
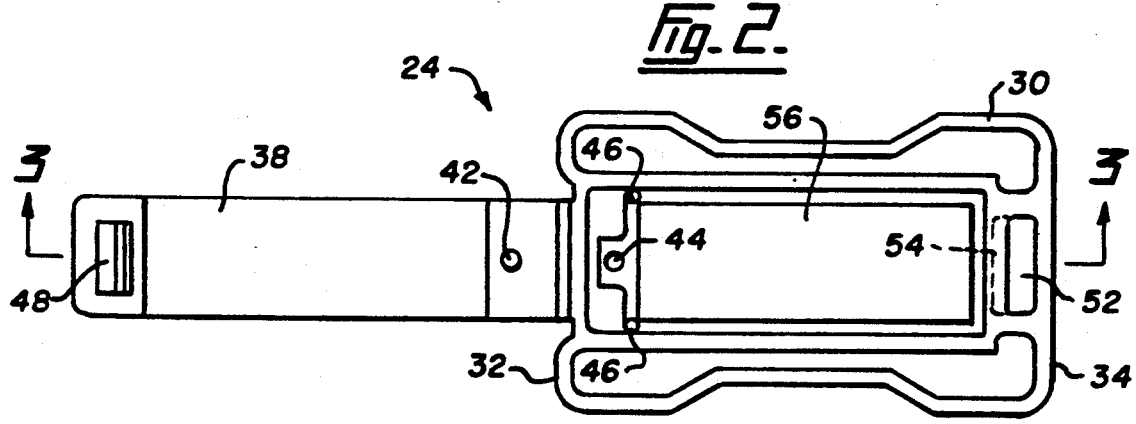
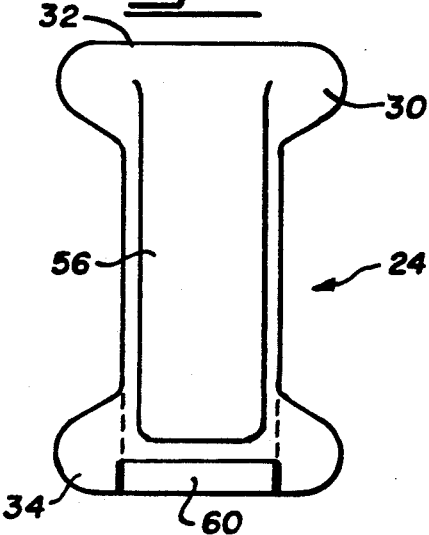
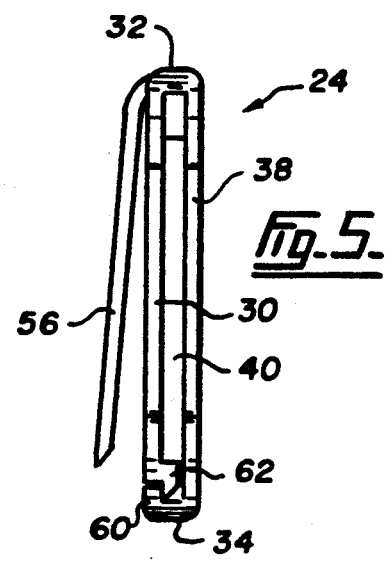

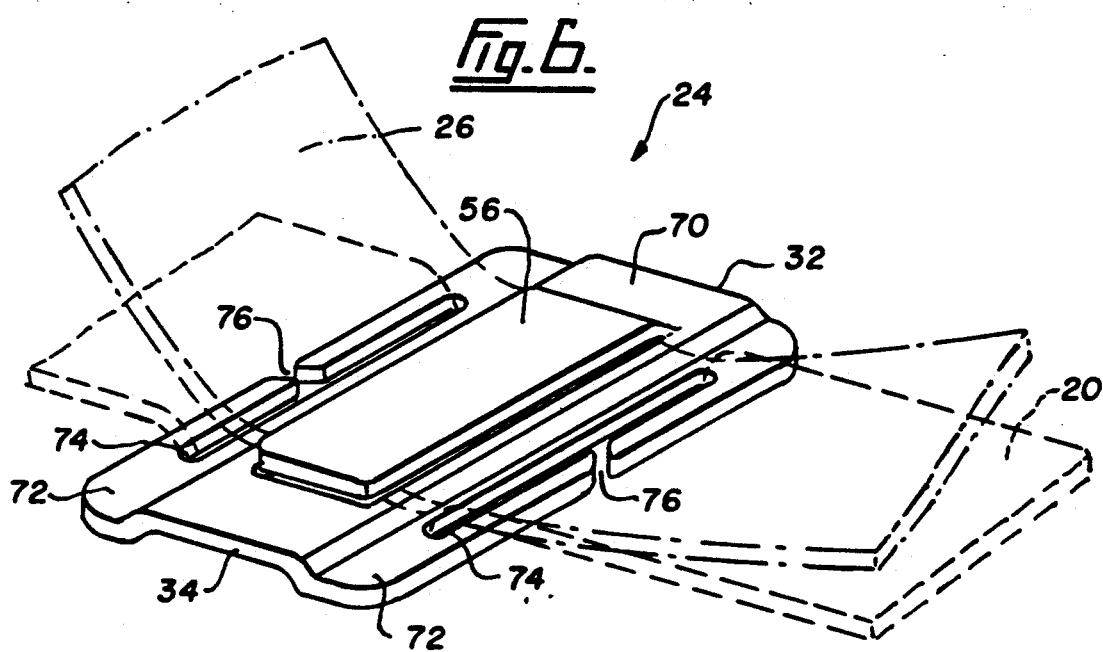

SEAT BELT ADJUSTER

TECHNICAL FIELD

The present invention relates to automobile seat belts and more specifically to an adjuster for holding together the lap seat belt and the shoulder belt at a location where the shoulder belt does not rub against a neck of a seat belt wearer.

BACKGROUND ART

Most seat belts used in vehicles, such as automobiles, trucks, etc., have a lap seat belt which extends across the lap of a wearer and also a shoulder belt which extends up from the attachment side of the belt, across the wearer's shoulder, thus providing protection to the wearer from being thrown forward in the event of a sudden stop. The lap seat belt holds the wearer in the seat and the shoulder belt prevents the wearer from jack-knifing forward. Most types of seat belts are adjustable for different sized passengers and drivers. A lap seat belt passes from one side of a seat across the seat to a releasable catch or attachment buckle on the other side of the seat. The belt passes through the catch or attachment buckle and then becomes a shoulder belt crossing over the front of a wearer and being attached at shoulder height above the seat at the side where the seat belt is initially attached.

The problem with such types of seat belts is that the angle of the shoulder belt from the catch or attachment buckle often extends across the neck of a wearer and this can become irritating as it rubs against the skin causing irritation. Devices have been made for attaching to the lap seat belt and having a clip to hold the shoulder belt. These devices slide along the lap seat belt, thus moving the angle of the shoulder belt to such a location where it does not rub against the neck of a wearer. One example of such a device is shown in U.S. Pat. No. 5,088,161 to Robertson.

The device disclosed in U.S. Pat. No. 5,088,161 is formed of two parts and when it is to be removed from a seat belt, requires one part to be detached from another. This invariably results in one of the parts dropping and becoming lost under the seat of a vehicle or even dropping outside the vehicle, thus one is left with only one part which by itself is useless.

DISCLOSURE OF INVENTION

The present invention provides novel seat belt adjuster which is a one piece unit having in one embodiment a hinge at one end and in another embodiment having a series of slots with gaps allowing the seat belt adjuster to be attached to the lap seat belt and detached from it but remaining in one piece so that the parts do not become separated.

The present invention provides a seat belt adjuster for holding a shoulder belt to a lap seat belt comprising a frame member formed of resilient material having a front portion, a rear portion, a top edge, a bottom edge, and space between the front portion and the rear portion for containing a lap seat belt, hinge means at the top edge of the frame member wherein the rear portion and the front portion are hinged together to permit the portions to open for fitting over a lap seat belt, retaining means at the bottom edge of the frame member to retain together the rear portion and the front portion to contain a lap seat belt, and a clip member forming part of the front portion of the frame member extending down from the top edge to form an open clip for retaining a shoulder belt.

In another embodiment there is provided a seat belt adjuster for holding a shoulder belt to a lap seat belt comprising a substantially rectangular frame member formed of resilient material having a raised central portion and two side flanges, the frame member having a top edge and a bottom edge, slots in the two side flanges extending from adjacent the top edge to adjacent the bottom edge, the slots having gaps therein to the outside of the flanges thus permitting a lap seat belt to be fitted into one slot in one flange, passed under the raised central portion and fitted into the other slot in the other flange such that the seat belt adjuster is held to the lap seat belt, and a clip member integral with the raised central portion extending down from the top edge of the raised central portion to form an open clip for retaining a shoulder belt.

BRIEF DESCRIPTION OF DRAWINGS

In drawings which illustrate embodiments of the present invention,

FIG. 1 is a diagrammatic view of a driver or passenger sitting on a seat in a vehicle with a seat belt such as the type described in the present invention in place to redirect the should belt away from the neck of the driver or passenger.

FIG. 2 is an elevational view showing one embodiment of a seat belt adjuster in the open position ready for attachment to a lap seat belt.

FIG. 3 is a sectional view taken at line 3—3 of FIG. 2 showing the seat belt adjuster partially open with the closed position shown in dotted lines.

FIG. 4 is a front elevational view showing another embodiment of a seat belt adjuster.

FIG. 5 is an end view of the seat belt adjuster shown in FIG. 4.

FIG. 6 is a perspective view of another embodiment of a seat belt adjuster according to the present invention.

MODES FOR CARRYING OUT THE INVENTION

A seat belt arrangement 10 is shown in FIG. 1 representative of the prior art for a passenger or driver 12 in a seat 14 within a vehicle 16. The seat belt 10 extends from a retracting mechanism 18 which is permanently attached to the side of the vehicle 16 below the seat 14 and has a lap seat belt 20 extending over to an attachment buckle 22. The belt is looped through the attachment buckle 22 and then passes to a seat belt adjuster 24 from where the shoulder belt 26 passes up over the shoulder of the wearer 12 to an attachment loop 28 at the side of the vehicle 16 above the retracting mechanism 18. The belt passes from the attachment loop 28 down to the retracting mechanism 18. It is the seat belt adjuster 24 which is the subject of the present application. The purpose of the seat belt adjuster 24 is to move the bottom location where the shoulder belt 26 departs from the lap seat belt 20, so that the belt does not rub against the neck of a wearer.

One embodiment of a seat belt adjuster 24 is shown in FIGS. 2 and 3 which comprises a fixed frame member 30 or front portion which is actually hollow at its centre and has a top edge 32 and a bottom edge 34. At the top edge 32 a living hinge 36, which is integrally molded, and connects the front portion 30 to a rear portion being a flap 38. The flap 38 is rectangular in shape and folds down as shown in FIG. 3 from a completely open position as shown in FIG. 2 to a closed position to provide a space 40 for holding a lap seat belt 20. The flap 38 has a pin 42 spaced from the hinge 36 which engages into an aperture 44 in the front portion 34. The pin 42 acts as a stop to prevent the belt from being pushed up on the flap 38 and preventing the hinge 36 from closing. Furthermore, on each side of the front portion 34 there are two further pegs 46 which extend up on either side of the flap 38 when it is in place. These two further pegs 46 also act as stops to prevent the belt from being forced into the hinge 36.

At the other end of the flap 38 is a hook member 48 having a hook 50. The hook member 48 fits into a cut-out slot 52 at the other end of the front portion 34. The slot 52 has a shoulder 54 which engages the hook 50 when the hook member 48 is pushed into the slot 52.

On the front of the front portion 34 is a clip member 56 integral with the front portion 34 and attached adjacent the top edge 32. The clip member 56 is provided to permit the shoulder belt 26 to be held to the lap seat belt 20 at a desired location to prevent the shoulder belt 26 from rubbing against the neck of a wearer 12.

As can be seen, to attach the seat belt adjuster 24 to a lap seat belt 20, it is necessary to first open the flap 38 by releasing the hook member 48 from the slot 52, pivoting open the flap 38 back, placing the lap seat belt 20 into the space 40 adjacent the front portion 34, then pivoting closed the flap 38 about the hinge 36 and snapping it into place by means of the hook member 48. The shoulder belt 26 is then hooked under the flap 56. The adjuster 24 may be moved along the lap seat belt 20 to a desired location to ensure that the shoulder belt 26 does not rub against the neck of a wearer.

FIGS. 4 and 5 illustrate another embodiment of the invention which is made from resilient material such as plastic. In another embodiment the adjuster 24 may be made from resilient metal or other suitable material. Unlike the embodiment shown in FIGS. 2 and 3, the seat belt adjuster 24 of FIGS. 4 and 5 does not have a living hinge 36 as shown in FIGS. 2 and 3, but has a rigid hinge at the top edge 32 thus relying on the flexibility of the material to provide the hinge movement. The rear portion or flap 38 extends for the full length of the front portion 30 and has a hook end 60 arranged to snap over a tapered shoulder 62 which is part of the front portion 30. Thus the rear portion 38 and the front portion 30 are held together by the hook 60 engaging the step 62. A space 40 is left therebetween for the lap seat belt 20 to pass through.

The resilient material, which is preferably a hard plastic, permits the front portion 30 and rear portion 38 to be opened and the hook 60 is released from the step 62. The two portions are forced apart relying more on the flexibility of the material rather than on the hinge at the top edge 32, however, there is some flexibility in this top edge portion and for the purposes of the present application, it is defined as a rigid hinge. The space 40 between the two portions 30,38 is sufficient to contain the lap seat belt 20 and permit it to be slid along the belt 20 to the preferred position.

As in the case of the seat belt adjuster shown in FIGS. 2 and 3 the clip member 56 is provided for clipping the shoulder belt 26 and guiding the shoulder belt to miss the neck of the wearer.

Another embodiment is shown in FIG. 6 which is a one piece arrangement of adjuster 24 having a generally rectangular frame which a central raised portion 70 and two side flanges 72 which extend from the top edge 32 to the bottom edge 34. The side flanges 72 have longitudinal slots 74 cut therein and the slots 74 have gaps 76 open to the edges of the flanges 72 thus permitting insertion of the lap seat belt 20 to fit into the slot 74 through the gaps 76. The clip member 56 is provided in the same manner as that shown in the other Figures for supporting the shoulder belt 26. The clip member 56 extends from the central raised member 70 adjacent the top edge 32.

All three of the seat belt adjusters shown in the drawings are integral units formed from one piece. The material of construction is preferably a resilient plastic of sufficient strength to grip the seat belt but not meant in any way to prevent the operation of the seat belt during an abrupt stop of a vehicle.

Various changes may be made to the embodiments shown herein without departing from the scope of the present invention which is limited only by the following claims.

The embodiments of the present invention in which an exclusive property or privilege is claimed are defined as follows:

1. A seat belt adjuster for holding a shoulder belt to a lap seat belt comprising:
   a frame member formed of resilient material having a front portion, a rear portion, a top edge, and a bottom edge, the front portion and the rear portion forming a channel therebetween for containing a lap seat belt;
   a hinge extending from the top edge of the frame member and pivotally coupling the rear portion and the front portion together to permit the portions to open for fitting over a lap seat belt;
   means for retaining the rear portion and the front portion together to contain a lap seat belt therebetween, the retaining means being at the bottom edge of the frame member;
   a clip member forming part of the front portion of the frame member and extending down from the top edge to form an open clip for retaining a shoulder belt;
   first and second pins coupled to the front portion of the frame member adjacent the hinge, the first and second pins being arranged to receive the rear portion therebetween and to prevent a lap seat belt positioned between the front and rear portions from contacting the hinge; and
   a third pin extending from one of the front and rear portions, the other one of the front and rear portions including a hole for receiving the third pin, the third pin, when positioned in the hole, being between the first and second pins and arranged to prevent a lap seat belt positioned between the front and rear portions from contacting the hinge.

2. The seat belt adjuster according to claim 1 wherein the front portion is wider than the rear portion.

3. The seat belt adjuster according to claim 2 wherein the hinge is a living hinge permitting the rear portion to open up to about a 180° angle from the front portion.

4. The seat belt adjuster according to claim 1 wherein the retaining means includes a hook member positioned adjacent the bottom edge of the rear portion for engagement in a slot formed in the front portion, the slot having a ledge means so that the hook portion hooks over and retains the rear portion to the front portion.

* * * * *